(12) United States Patent
Wen et al.

(10) Patent No.: US 9,819,420 B2
(45) Date of Patent: Nov. 14, 2017

(54) POLARIZATION STATE ALIGNER (PSA)

(71) Applicant: Futurewei Technologies, Inc., Plano, TX (US)

(72) Inventors: Yangjing Wen, Cupertino, CA (US); Fei Zhu, Coral Gables, FL (US); Yu Sheng Bai, Los Altos Hills, CA (US)

(73) Assignee: Futurewei Technolgies, Inc., Plano, TX (US)

( * ) Notice: Subject to any disclaimer, the term of this patent is extended or adjusted under 35 U.S.C. 154(b) by 0 days.

(21) Appl. No.: 15/057,379

(22) Filed: Mar. 1, 2016

(65) Prior Publication Data

US 2016/0261352 A1 Sep. 8, 2016

Related U.S. Application Data (60) Provisional application No. 62/127,057, filed on Mar. 2, 2015.

(51) Int. Cl.
| | | |
|---|---|---|
| *H04B 14/00* | (2006.01) |
| *H04B 10/61* | (2013.01) |
| *H04B 10/532* | (2013.01) |
| *H04B 10/2507* | (2013.01) |
| *H04B 10/50* | (2013.01) |

(52) U.S. Cl.
CPC ....... *H04B 10/614* (2013.01); *H04B 10/2572* (2013.01); *H04B 10/5053* (2013.01); *H04B 10/532* (2013.01); *H04B 10/6151* (2013.01)

(58) Field of Classification Search
CPC ...... H04J 14/06; H04J 14/02; G01B 2290/70; G02B 27/283; H04B 10/2572; H04B 10/532
USPC ........................................................ 398/152
See application file for complete search history.

(56) References Cited

U.S. PATENT DOCUMENTS

| | | | | |
|---|---|---|---|---|
| 8,462,349 B1* | 6/2013 | Rhoadarmer | ...... | G01B 9/02097 356/491 |
| 2004/0008916 A1 | 1/2004 | Ridgway et al. | | |
| 2004/0208646 A1* | 10/2004 | Choudhary | .......... | H04B 10/505 398/188 |
| 2010/0098420 A1* | 4/2010 | Ibragimov | .............. | H04J 14/06 398/65 |
| 2012/0008951 A1 | 1/2012 | Mikami | | |

(Continued)

FOREIGN PATENT DOCUMENTS

| | | |
|---|---|---|
| CN | 102333059 A | 1/2012 |
| CN | 103635853 A | 3/2014 |

(Continued)

OTHER PUBLICATIONS

Partial English Translation and Abstract of International Patent Application No. WO2015176311, Jul. 9, 2016, 8 pages.

(Continued)

*Primary Examiner* — Don N Vo
(74) *Attorney, Agent, or Firm* — Conley Rose, P.C.

(57) ABSTRACT

A system comprises: a polarization state aligner (PSA) comprising: an input port; a first polarization beam splitter (PBS) coupled to the input port; a first phase shifter (PS) coupled to the first PBS; a first polarization rotator (PR) coupled to the first PBS; a first beam splitter (BS) coupled to the first PS and the first PR; a first output port coupled to the first BS; and a second output port coupled to the first BS.

23 Claims, 6 Drawing Sheets

(56) References Cited

U.S. PATENT DOCUMENTS

| | | | |
|---|---|---|---|
| 2013/0100456 A1* | 4/2013 | Yu | H01S 3/0823 |
| | | | 356/479 |
| 2014/0133869 A1 | 5/2014 | Suzuki et al. | |
| 2014/0314366 A1 | 10/2014 | Yamazaki et al. | |
| 2016/0223920 A1* | 8/2016 | Tinnemans | G03F 9/7049 |

FOREIGN PATENT DOCUMENTS

| | | |
|---|---|---|
| CN | 103959144 A | 7/2014 |
| EP | 3035113 A1 | 6/2016 |
| JP | 2011064657 A | 3/2011 |
| WO | 2015176311 A1 | 11/2015 |

OTHER PUBLICATIONS

Foreign Communication From a Counterpart Application, PCT Application No. PCT/CN2016/075335, International Search Report dated Jun. 7, 2016, 7 pages.

Foreign Communication From a Counterpart Application, PCT Application No. PCT/CN2016/075335, Written Opinion dated Jun. 7, 2016, 8 pages.

Johnson, J.E., Ed., "Implementation Agreement for Integrated Dual Polarization Intradyne Coherent Receivers," OIF Optical Internetworking Forum, Working Group: Physical and Link Layer (PLL) Working Group, IA # OIF-DPC-RX-01.2, Nov. 14, 2013, 25 pgs.

Bouda, M., Ed., "Implementation Agreement for Integrated Polarization Multiplexed Quadrature Modulated Transmitters," OIF Optical Internetworking Forum, Working Group: Physical and Link Layer (PLL) Working Group, IA # OIF-PMQ-TX-01.1, Aug. 27, 2013, 23 pgs.

Dai, D., et al., "Passive technologies for future large-scale photonic integrated circuits on silicon: polarization handling, light non-reciprocity and loss reduction," Light: Science & Applications (2012) CIOMP, 12 pgs.

* cited by examiner

POLARIZATION STATE ALIGNER (PSA)

CROSS-REFERENCE TO RELATED APPLICATIONS

This application claims priority to U.S. provisional patent application No. 62/127,057 filed Mar. 2, 2015 by Yangjing Wen, et al., and titled "Polarization State Aligner (PSA)," which is incorporated by reference.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Optical fibers are widely used for providing communications links. Communications links employing optical fibers provide many advantages compared to communications links employing electrical media. Those advantages include larger bandwidth, higher noise immunity, reduced power dissipation, and reduced crosstalk. The rapid growth of optical communications links and the need for greater capacity has led research and industry to employ more advanced and higher-order modulation schemes.

SUMMARY

In one embodiment, the disclosure includes a system comprising: a polarization state aligner (PSA) comprising: an input port; a first polarization beam splitter (PBS) coupled to the input port; a first phase shifter (PS) coupled to the first PBS; a first polarization rotator (PR) coupled to the first PBS; a first beam splitter (BS) coupled to the first PS and the first PR; a first output port coupled to the first BS; and a second output port coupled to the first BS. In some embodiments, the system further comprises: a receiver coupled to the PSA and comprising: a second PBS; a first 90 degree (°) hybrid mixer coupled to the second PBS and the first output port; first photodiodes (PDs) coupled to the first 90° hybrid mixer; first transimpedance amplifiers (TIAs) coupled to the first PDs; and a digital signal processor (DSP) coupled to the first TIAs; the system further comprises: a second PR coupled to the second PBS; a second 90° hybrid mixer coupled to the second PR and the BS; second PDs coupled to the second 90° hybrid mixer; and second TIAs coupled to the second PDs and the DSP; the system further comprises: a modulator system coupled to the PSA and comprising: an in-phase (I) modulator coupled to the first output port; a quadrature phase (Q) modulator coupled to the second output port; a second PS coupled to the Q modulator; and a beam combiner (BC) coupled to the I modulator and the second PS; the I modulator and the Q modulator comprise Mach-Zehnder modulators (MZMs); the system further comprises: a modulator system coupled to the PSA and comprising: an X component (X) modulator coupled to the first output port; a Y component (Y) modulator coupled to the second output port; a second PR coupled to the Y modulator; and a polarization beam combiner (PBC) coupled to the X modulator and the second PR; the X modulator and the Y modulator are any combination of Mach-Zehnder modulators (MZMs), electro-absorption (EA) modulators, or in-phase and quadrature phase (IQ) modulators; the system further comprises: a modulator system coupled to the PSA and comprising: a second BS coupled to the first output port; a first modulator coupled to the second BS; a second modulator coupled to the second BS; a third BS coupled to the second output port; a third modulator coupled to the third BS; and a fourth modulator coupled to the third BS; the system further comprises: a substrate, wherein the PSA and the modulator system are integrated on the substrate; the system further comprises: a waveguide medium coupling the first PBS to the input port, the first PS to the first PBS, the first PR to the first PBS, the first BS to the first PS and the first PR, the first output port to the first BS, and the second output port to the first BS; the waveguide medium comprises air; the waveguide medium comprises one of silicon (Si), silicon dioxide ($SiO_2$), or indium phosphide (InP).

In another embodiment, the disclosure includes a system comprising: a polarization state aligner (PSA) configured to: receive an input light from an optical component at an input polarization; split the input light into a first light and a second light, wherein the first light comprises an output polarization corresponding to an optoelectronic circuit, and wherein the second light comprises a first polarization; rotate the first polarization to the output polarization; combine the first light and the second light; and provide to the optoelectronic circuit a first output light associated with the first light and a second output light associated with the second light; wherein the first output light and the second output light comprise the output polarization; In some embodiments, the input polarization is any arbitrary polarization, the output polarization is a transverse electric (TE) polarization, and the first polarization is a transverse magnetic (TM) polarization; the PSA comprises: a polarization beam splitter (PBS) configured to: receive the input light; and split the input light into the first light and the second light; a polarization rotator (PR) coupled to the PBS and configured to rotate the first polarization to the output polarization; and a phase shifter (PS) coupled to the PBS and configured to shift a first phase of the first light to a second phase so that a phase delay between the first light and the second light is an integer multiple of $\pi$; the PSA comprises: a polarization splitter-rotator (PSR) configured to: receive the input light; split the input light into the first light and the second light; and rotate the first polarization to the output polarization; and a phase shifter (PS) coupled to the PSR and configured to shift a first phase of the second light to a second phase so that a phase delay between the first light and the second light is an integer multiple of $\pi$; the optical component is a standard single-mode fiber (SSMF) that does not maintain polarization.

In yet another embodiment, the disclosure includes a method comprising: receiving an input light from an optical component at an input polarization; splitting the input light into a first light and a second light, wherein the first light comprises an output polarization corresponding to an optoelectronic circuit, and wherein the second light comprises a first polarization; rotating the first polarization to the output polarization; shifting a phase of the first light, the second light, or both so that a phase delay between the first light and the second light equalizes a first power of a first output light to a second power of a second output light; combining the first light and the second light; and providing to the optoelectronic circuit the first output light and the second output light, wherein the first output light is associated with the first light and the second output light is associated with the second light; wherein the first output light and the second output light comprise the output polarization. In some embodiments, the method further comprises: providing to a coherent receiver the first output light as a first local oscillator (LO) optical signal; and providing to the coherent receiver the second output light as a second LO optical signal; the method further comprises: providing to a modulator system the first output light as a first continuous wave (CW) light; and providing to the modulator system the second output light as a second CW light.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

High-speed optical transceivers are key components in optical communications systems. Systems that combine advanced modulation formats such as higher-order quadrature amplitude modulation (QAM) with coherent detection have shown high performance and high capacity. In this context, coherent detection refers to the detection of both amplitude information and phase information in order to recover a signal.

Such advanced modulation formats are implemented in both a transmitter and a receiver. In the transmitter, a modulator such as an in-phase and quadrature phase (IQ) modulator modulates data onto a continuous wave (CW) light to produce a modulated optical signal. Such modulation is polarization dependent, so a CW laser and the modulator need to have matching polarizations. In the receiver, an integrated coherent receiver (ICR) receives the modulated optical signal and a local oscillator (LO) optical signal, wherein the LO optical signal beats with the modulated optical signal in order for the ICR to recover phase information. Such recovery is polarization dependent, so the LO optical signal and the ICR need to have matching polarizations. Thus, both the transmitter and the receiver need polarization alignment between their respective components.

Bouda, et al., "Implementation Agreement for Integrated Polarization Multiplexed Quadrature Modulated Transmitters," Optical Internetworking Forum, Aug. 27, 2013 ("Bouda"), which is incorporated by reference, employs polarization-maintaining fiber (PMF) to connect a CW laser to a modulator. Similarly, Johnson, et al., "Implementation Agreement for Integrated Dual Polarization Intradyne Coherent Receivers," Optical Internetworking Forum, Nov. 14, 2013 ("Johnson"), which is incorporated by reference, employs a PMF to connect a LO optical signal source to a coherent receiver. PMF is much more costly than standard single-mode fiber (SSMF) and other fibers that are not polarization maintaining. In prior approaches, where the CW laser is relatively close to the modulator in the transmitter and where the LO source is relatively close to the coherent receiver in the receiver, the extra cost of PMF may not be an issue since the fiber length is relatively short. However, in other applications where the fiber length is longer, the extra cost of PMF may be an issue. There is therefore a need to match polarizations in transmitters and receivers, but without the use of PMFs.

Disclosed herein are embodiments for PSAs. The PSAs receive light beams or signals from fibers or other optical components, adjust the polarizations of the light beams or signals to desired polarizations of optoelectronic circuits, and pass the light beams or signals to the optoelectronic circuits. The optoelectronic circuits comprise IQ modulators, ICRs, or other components. The PSAs address the polarization dependence of those components. Because the PSAs adjust the polarizations of the lights to desired polarizations, the PSAs allow for use of SSMFs and other fibers, which are not polarization maintaining, instead of PMFs. The PSAs reduce cost, particularly when longer fibers are needed to couple components. For a data center transmitter application, multiple laser sources may be in an end of row (EoR) switch, and modulators corresponding to the laser sources may be relatively far away in a top of rack (ToR) switch and coupled to the laser sources via SSMFs. For a fronthaul transmitter application, multiple laser sources may be in a base band unit (BBU), and modulators corresponding to the laser sources may be relatively far away in a remote radio unit (RRU) and coupled to the laser sources via SSMFs. Similarly, for a receiver system application, a LO optical signal source may be relatively far away and coupled to a coherent receiver via a SSMF. In this context, relatively far away may mean at least a few meters (m) and up to tens of kilometers (km). Though the PSAs reduce costs for short-haul applications in particular, the PSAs may also be used in metro applications.

Figures 1, 3:
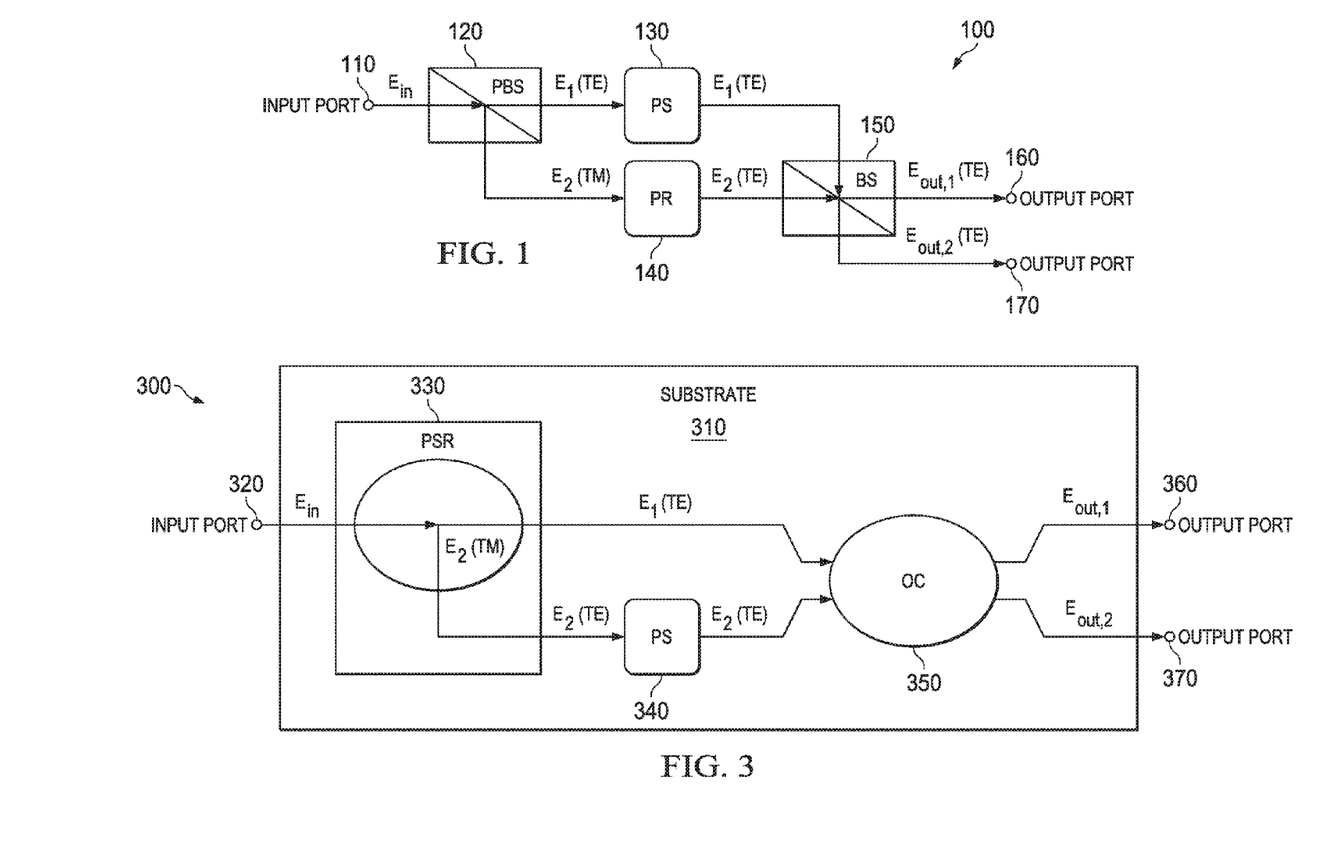
FIG. 1 is a schematic diagram of a PSA according to an embodiment of the disclosure.
FIG. 3 is a schematic diagram of an integrated PSA according to an embodiment of the disclosure.

FIG. 1 is a schematic diagram of a PSA 100 according to an embodiment of the disclosure. The PSA 100 comprises an input port 110, a polarization beam splitter (PBS) 120, a phase shifter (PS) 130, a polarization rotator (PR) 140, a beam splitter (BS) 150, an output port 160, and an output port 170. The lines connecting those components represent light beams or signals. The light beams or signals are labeled as variants of the letter "E," which indicates an optical field in root square watts ($W^{1/2}$). In addition, the light beams or signals are labeled with their polarizations at various points. The polarizations include transverse electric (TE) and transverse magnetic (TM). Though not shown, the light travels through air in a free-space optics application or through an optical waveguide medium comprising silicon (Si), silicon dioxide ($SiO_2$), indium phosphide (InP), or other suitable material in a waveguide application. Though the PS 130 is shown in a top branch of the PSA 100, the PS 130 may instead be in a bottom branch of the PSA 100 or be in both the top branch and the bottom branch of the PSA 100.

In operation, an input light $E_{in}$ enters the PSA 100 through the input port 110. $E_{in}$ may enter from an SSMF and therefore have any arbitrary polarization. $E_{in}$ passes from the input port 110 to the PBS 120. The PBS 120 splits $E_{in}$ into a first light $E_1$ with a TE polarization and a second light $E_2$ with a TM polarization. The PBS 120 then passes $E_1$ to the PS 130 and $E_2$ to the PR 140. The PS 130 performs a phase shift of $E_1$ as described below and passes $E_1$ to the BS 150. After the phase shift of $E_1$, the difference in phase between $E_1$ and $E_2$ is referred to as a phase delay. The PR 140 rotates $E_2$ 90 degrees (°) so that $E_2$ has a TE polarization, and the PR 140 passes $E_2$ to the BS 150. Finally, the BS 150 receives both $E_1$ and $E_2$, combines $E_1$ and $E_2$, and passes $E_{out,1}$ to the output port 160 and $E_{out,2}$ to the output port 170. When the phase shift is a particular value, then $E_1$ and $E_2$ have the same power. In addition, $E_1$ and $E_2$ have the same TE polarization, which may be the desired polarization of a subsequent optoelectronic circuit. Thus, for whatever arbitrary polarization $E_{in}$ has, $E_{out,1}$ and $E_{out,2}$ have the same TE polarization and have the same power.

When $E_1$ and $E_2$ enter the BS 150, they may be expressed as follows:

$$E_1 = E_0 e^{j[\omega t + \phi(t)]} \cos\theta \quad (1)$$

$$E_2 = E_0 e^{j[\omega(t-\tau) + \phi(t) + \Delta\varphi]} \sin\theta \quad (2)$$

where $E_1$ is an optical field of a light entering the BS 150 from the top branch of the PSA 100, $E_0$ is an amplitude of an optical field of $E_{in}$, e is an exponential function, j is an imaginary number, $\omega$ is an optical carrier frequency in units of hertz (Hz), t is time in units of second (s), $\phi$ is an optical phase that may include phase noise and is in units of radians, $\theta$ is a relative angle between a polarization of $E_{in}$ and a TE polarization of the PBS 120 and is in units of degrees (°), $E_2$ is an optical field of the light entering the BS 150 from the bottom branch of the PSA 100, $\tau$ is a time delay between $E_1$ and $E_2$ and is in units of seconds (s), and $\Delta\varphi$ is a phase delay introduced between $E_1$ and $E_2$ and is in units of radians. $E_{out,1}$ and $E_{out,2}$ are expressed as follows:

$$E_{out,1} = \frac{1}{\sqrt{2}} E_1 + \frac{1}{\sqrt{2}} E_2 e^{j\pi/2} \quad (3)$$

$$E_{out,1} = \frac{1}{\sqrt{2}} E_0 \sqrt{1 - \sin(-\omega\tau + \Delta\phi)\sin 2\theta}\, e^{j[\omega t + \varphi(t)] + j\Phi_1}$$

$$E_{out,2} = \frac{1}{\sqrt{2}} E_1 e^{j\pi/2} + \frac{1}{\sqrt{2}} E_2 \quad (4)$$

$$E_{out,2} = \frac{1}{\sqrt{2}} E_0 \sqrt{1 + \sin(-\omega\tau + \Delta\phi)\sin 2\theta}\, e^{j[\omega t + \varphi(t)] + j\pi/2 + j\Phi_2}$$

$\Phi_1$ and $\Phi_2$, which are the phase in units of radians of $E_{out,1}$ and $E_{out,2}$, respectively, are expressed as follows:

$$\Phi_1 = \arctan\left( \frac{\cos(-\omega\tau + \Delta\phi)\sin\theta}{\cos\theta - \sin(-\omega\tau + \Delta\phi)\sin\theta} \right)$$

$$\Phi_2 = \arctan\left( \frac{\cos(-\omega\tau + \Delta\phi)\sin\theta}{\cos\theta + \sin(-\omega\tau + \Delta\phi)\sin\theta} \right)$$

The powers in units of watts (W) of $E_1$ and $E_2$ are respectively as follows:

$$P_{out,1} = |E_{out,1}|^2 \quad (5)$$

$$P_{out,1} = \frac{1}{2}|E_0|^2 (1 - \sin(-\omega\tau + \Delta\phi)\sin 2\theta)$$

$$P_{out,1} = \frac{1}{2} P_0 [1 - \sin(\Delta\varphi)\sin 2\theta]$$

$$P_{out,2} = |E_{out,2}|^2 \quad (6)$$

$$P_{out,1} = \frac{1}{2}|E_0|^2 (1 + \sin(-\omega\tau + \Delta\phi)\sin 2\theta)$$

$$P_{out,1} = \frac{1}{2} P_0 [1 + \sin(\Delta\varphi)\sin 2\theta],$$

where $\Delta\phi = -\omega\tau + \Delta\phi$ is a total phase delay between $E_1$ and $E_2$ and $P_0$ is the power of $E_{in}$ in units of watts. Equations (5) and (6) show that, if $\Delta\phi = k\pi$, where k is an integer, then the dependence of $P_1$ and $P_2$ on $\theta$ can be eliminated so that $P_1$ and $P_2$ are both equal to $P_0/2$.

A processor, which is described below, performs the calculations and instructs the PS 130 to perform the phase shift of $E_1$ based on the calculations. The PS 130 may be a heater or phase modulator. If the PS 130 is a heater, then the PS 130 provides a heat based on instructions from the processor. If the PS 130 is a phase modulator, then the PS 130 provides a voltage or current based on the instructions from the processor.

Figure 2:
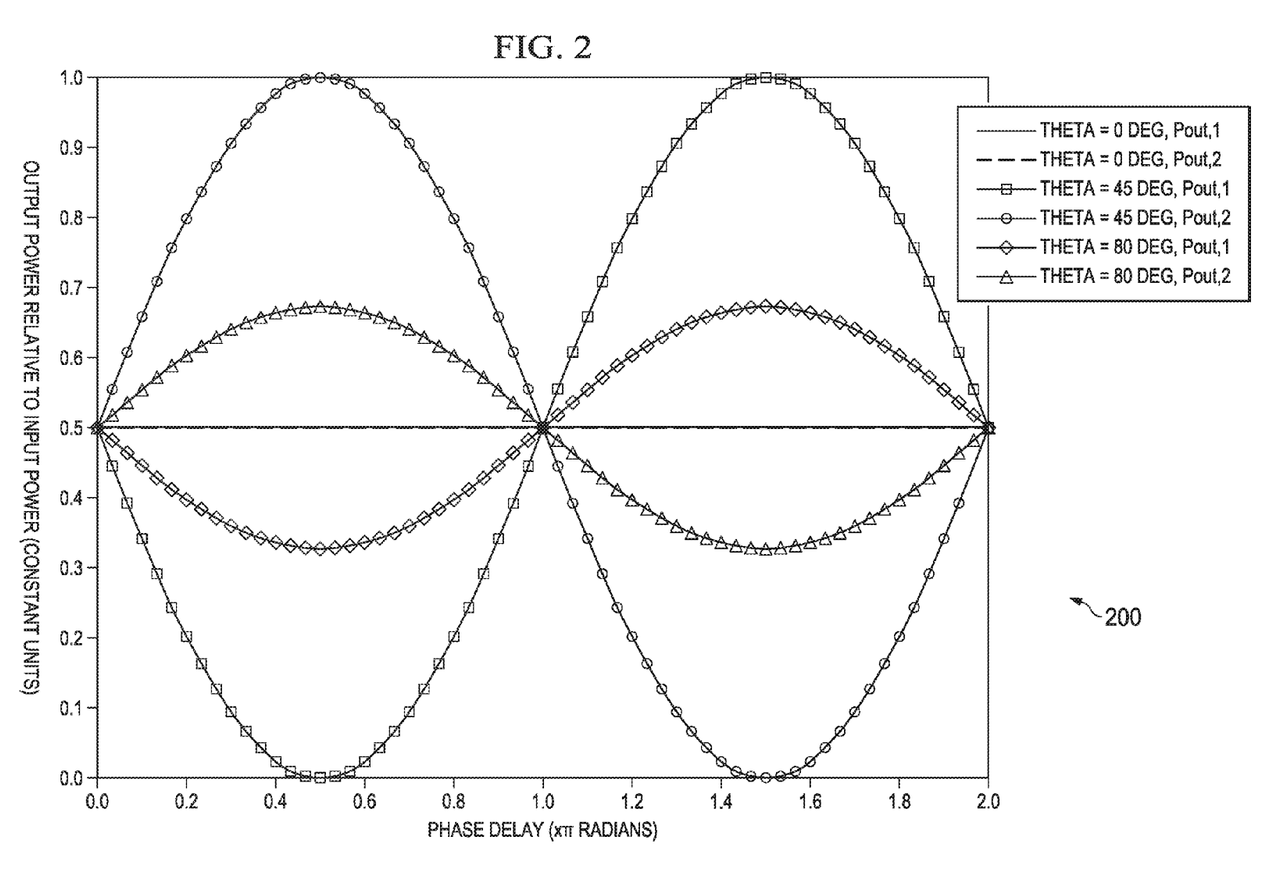
FIG. 2 is a graph of output as a function of phase delay for various values of a relative angle for the PSA in FIG. 1.

FIG. 2 is a graph 200 of output as a function of phase delay for various values of a relative angle for the PSA 100 in FIG. 1. The x-axis represents the phase delay $\Delta\phi$ in $x\pi$ radians, where x is between 0 and 2. For instance, the value 1 indicates that the phase delay $\Delta\phi$ is $1\pi$ radians. The y-axis represents output power relative to input power in arbitrary or constant units. For instance, the value 0.5 indicates that $P_{out,1}$ is half of $P_0$. The relative angle is $\theta$, and its various values are 0°, 45°, and 80°. For all of the values of 0, the relative powers of $P_1$ and $P_2$ vary with $\Delta\phi$ and have a complementary relationship. As can be seen, when $\Delta\phi$ in $1\pi$ radians and $2\pi$ radians, the relative powers of $P_1$ and $P_2$ are both 0.5. In other words, $P_1$ and $P_2$ are half of $P_0$. As mentioned above, the same is true when $\Delta\phi$ is any k multiple of $\pi$. For relative angles $\theta = N\pi/2$, where N is an integer, $P_1$ and $P_2$ have equal power regardless of $\Delta\phi$.

The time delay $\tau$ can be designed to be zero to reduce wavelength dependence. However, fabrication may introduce some variation in $\tau$ so that $\tau$ is not zero. For a typical single wavelength operation, $\omega\tau$ is a single value, but the optical carrier frequency $\omega$ may vary due to a wavelength drift. The wavelength drift may be ±6.5 nanometers (nm) for an uncooled coarse wavelength-division multiplexing (CWDM) laser, but the wavelength drift is typically relatively slow. Thus, the wavelength drift can be tracked, and the wavelength drift can be compensated for by adjusting the phase delay $\Delta\phi$. When the wavelength drift is relatively fast, a free spectral range (FSR) of 100 gigahertz (GHz) for delay tolerance provides for tracking and compensation of wavelength drift. An FSR of 100 GHz corresponds to a time delay $\tau$ of 10 picoseconds (ps), so the length difference, or tolerance, between the top branch of the PSA 100 and the bottom branch of the PSA 100 is about 0.75 millimeters (mm) for a silicon waveguide with a refractive index of about 4. That tolerance is realistic for available fabrication techniques.

Equations (3) and (4) show that, if $-\omega\tau+\Delta\phi=k\pi$, then $\Phi_1$ and $\Phi_2$ are both equal to $\theta$. The variations of $\Phi_1$ and $\Phi_2$ are therefore slow. Thus, the variations of $\Phi_1$ and $\Phi_2$ may be tracked and compensated for.

FIG. 3 is a schematic diagram of an integrated PSA 300 according to an embodiment of the disclosure. The PSA 300 comprises a substrate 310, an input port 320, a polarization splitter-rotator (PSR) 330, a PS 340, an optical coupler (OC) 350, an output port 360, and an output port 370. The PSA 300 is referred to as an integrated PSA because, unlike for the PSA 100, the components of the PSA 300 are integrated into or onto the substrate 310 during fabrication. The substrate 310 comprises silicon. Light travels through a silicon-based optical waveguide.

In operation, $E_{in}$ enters the PSA 100 through the input port 320. $E_{in}$ may enter from an SSMF and therefore have any arbitrary polarization. $E_{in}$ passes from the input port 320 to the PSR 330. The PSR 330 splits $E_{in}$ into a first light $E_1$ with a TE polarization and a second light $E_2$ with a TM polarization. The PSR 330 then passes $E_1$ to the OC 350. In addition, the PSR 330 rotates $E_2$ 90° so that $E_2$ has a TE polarization, and the PSR 330 passes $E_2$ to the PS 340. The PS 340 performs a phase shift of $E_2$ as described above and passes $E_2$ to the OC 350. After the phase shift of $E_1$, the difference in phase between $E_1$ and $E_2$ is referred to as a phase delay. Finally, the OC 350 receives both $E_1$ and $E_2$, combines $E_1$ and $E_2$, and passes $E_{out,1}$ to the output port 360 and $E_{out,2}$ to the output port 370. When the phase shift is a particular value, then $E_1$ and $E_2$ have the same power. In addition, $E_1$ and $E_2$ have the same TE polarization, which may be the desired polarization of a subsequent optoelectronic circuit. Thus, for whatever arbitrary polarization $E_{in}$ has, $E_{out,1}$ and $E_{out,2}$ have the same TE polarization and have the same power. Equations (1)-(6) apply to $E_1$, $E_2$, $E_{out,1}$ and $E_{out,2}$ in the PSA 300 as they do to the PSA 100 in FIG. 1, except the light paths are reversed. For instance, equation (1) applies to $E_2$ and equation (2) applies to $E_1$.

Figure 4:
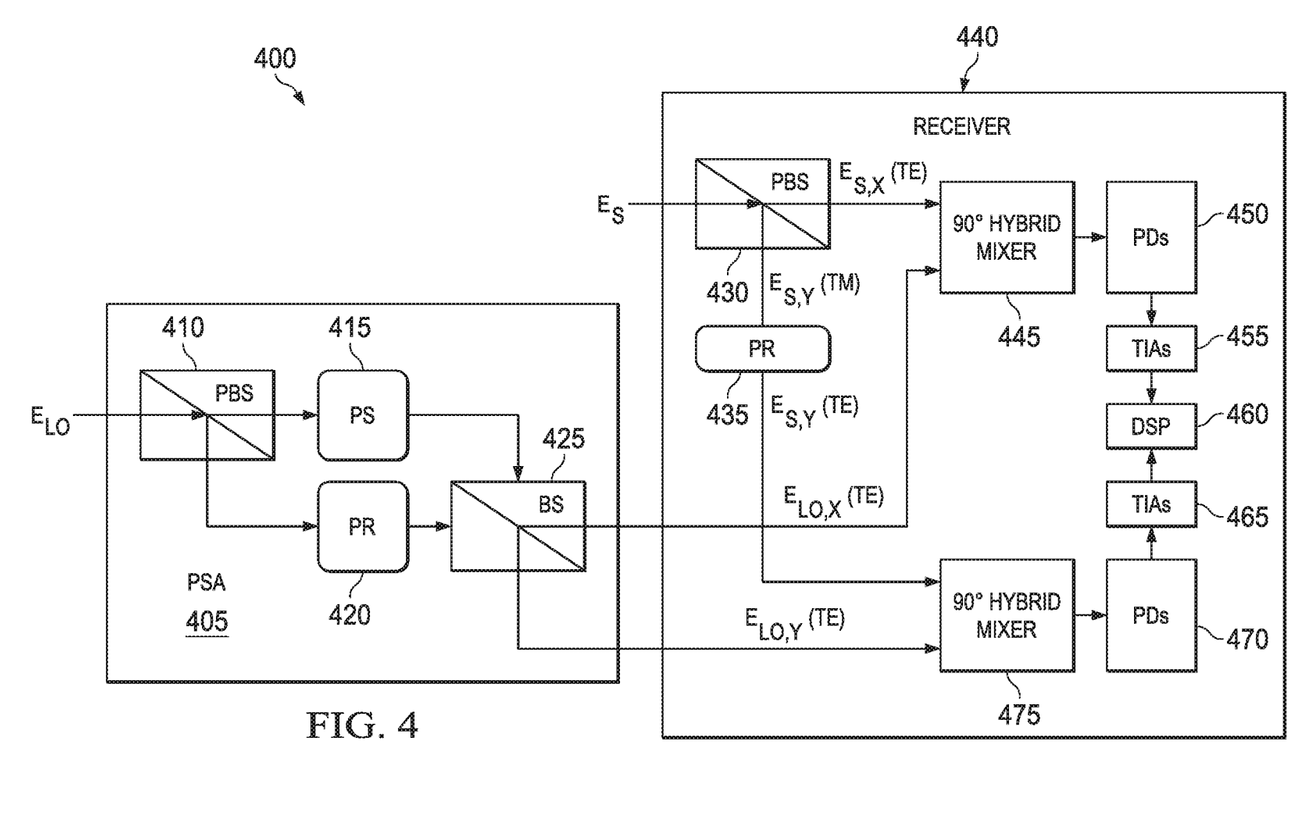
FIG. 4 is a schematic diagram of a dual-polarization coherent receiver system according to an embodiment of the disclosure.

FIG. 4 is a schematic diagram of a dual-polarization coherent receiver system 400 according to an embodiment of the disclosure. The system 400 generally comprises a PSA 405, which is similar to the PSA 100, and a receiver 440. Thus, the system 400 provides one implementation of the PSA 100. The PSA 405 may replace a PBS in other dual-polarization coherent receiver systems. The PSA 405 and the receiver 440 may be integrated on a silicon substrate.

The PSA 405 comprises a PBS 410, a PS 415, a PR 420, and a BS 425 that are similar to the PBS 120, the PS 130, the PR 140, and the BS 150, respectively, in the PSA 100. The receiver 440 is a dual-polarization coherent receiver and comprises a PBS 430, a PR 435, a 90° hybrid mixer 445, photodiodes (PDs) 450, transimpedance amplifiers (TIAs) 455, a digital signal processor (DSP) 460, a 90° hybrid mixer 475, PDs 470, and TIAs 465. Though the PDs 450, 470 and the TIAs 455, 465 are shown as single components, they may represent four or any suitable number of PDs or TIAs.

In operation, the PSA 405 receives an LO optical signal $E_{LO}$ from an LO optical signal source, which may be relatively far away from the system 400 in a transmitter. If the LO optical signal source is coupled to the system 400 via an SSMF, then the polarization of the $E_{LO}$ may vary with time. Nonetheless, as described for the PSA 100, the PSA 405 provides $E_{LO,X}$ and $E_{LO,Y}$, which have the same TE polarization and the same power. $E_{LO,X}$ is a LO optical signal for an X polarization component, and $E_{LO,Y}$ is a LO optical signal for a Y polarization component. The receiver 440 receives a modulated optical signal $E_S$ from a signal source, which likewise may be relatively far away from the system 400 in a transmitter. The PBS 430 splits $E_S$ into a $E_{S,X}$, which has a TE polarization, and $E_{S,Y}$, which has a TM polarization. The PR 435 rotates the polarization of $E_{S,Y}$ to a TE polarization. The 90° hybrid mixer 445 introduces a 90° phase shift between $E_{S,X}$ and $E_{S,Y}$, which the PDs 450 detect, the TIAs 455 amplify, and the DSP 460 converts from analog to digital and then processes. Similarly, the 90° hybrid mixer 475 introduces a 90° phase shift between $E_{LO,X}$ and $E_{LO,Y}$, which the PDs 470 detect, the TIAs 465 amplify, and the DSP 460 converts from analog to digital and then processes.

Self-homodyne detection (SHD) means that an LO optical signal and a modulated optical signal are at the same wavelength. For SHD, $E_{S,X}$ is expressed as follows:

$$E_{S,X}=E_{sig,X}(t_s)e^{[j(\omega t_s+\phi_{sig}(t_s)+\phi(t_s))]} \qquad (7)$$

where $E_{sig,X}$ is a signal waveform, $t_s$ is a time in units of seconds, $\phi_{sig}$ is a phase encoded by data, and $\phi$ is phase noise. $E_{LO,X}$ is expressed as follows:

$$E_{LO,X}=\frac{1}{\sqrt{2}}E_{LO,0}\sqrt{1-\sin(-\omega\tau+\Delta\phi)\sin 2\theta}\,e^{[j(\omega t_{lo}+\varphi(t_{lo})+j\Phi_1)]} \qquad (8)$$

where $E_{LO,0}$ is an optical field amplitude of $E_{LO}$ and $t_{lo}$ is an LO time in units of seconds. For balanced detection, the output photocurrents that the PDs 450 provide for an in-phase (I) channel and a quadrature phase (Q) channel respectively are as follows:

$$I_{XI}=\frac{1}{\sqrt{2}}E_{sig,X}(t_s)E_{LO,0}\sqrt{1-\sin(-\omega\tau+\Delta\phi)\sin 2\theta}\cos(\Delta\Phi_{XI}) \qquad (9)$$

$$I_{XQ}=\frac{1}{\sqrt{2}}E_{sig,X}(t_s)E_{LO,0}\sqrt{1-\sin(-\omega\tau+\Delta\phi)\sin 2\theta}\sin(\Delta\Phi_{XQ}) \qquad (10)$$

$\Delta\Phi_{XI}$ and $\Delta\Phi_{XQ}$, in turn, are expressed as follows:

$$\Delta\Phi_{XI}=\Delta\Phi_{XQ}=\Delta\Phi$$

$$\Delta\Phi_{XI}=\Delta\Phi_{XQ}=\phi_{sig}(t_s)+\omega(t_s-t_{lo})+\phi(t_s)-100\,(t_{lo})+\Phi_1 \qquad (11)$$

When setting $-\omega t+\Delta\phi=k\pi$, equations (9)-(11) can be expressed respectively as follows:

$$I_{XI}=\frac{1}{\sqrt{2}}E_{sig,X}(t_s)E_{LO,0}\cos(\Delta\Phi_{XI}) \qquad (12)$$

$$I_{XQ}=\frac{1}{\sqrt{2}}E_{sig,X}(t_s)E_{LO,0}\sin(\Delta\Phi_{XQ}) \qquad (13)$$

$$\Delta\Phi_{XI}=\Delta\Phi_{XQ}=\varphi_{sig}(t_s)+\omega(t_s-t_{lo})+\varphi(t_s)-\varphi(t_{lo})+\theta \qquad (14)$$

As shown, $\Delta\Phi$ includes $\phi_{sig}(t_s)$, the phase encoded by data; $\omega(t_s-t_{lo})$, a phase delay introduced by the carrier and a time delay between the signal and the LO; $\phi(t_s)$, the phase difference due to phase noise; and $\theta$, the phase due to the polarization orientation of the LO. $\theta$ becomes part of the total extracted phase difference. Except for a data-modulated phase term, other phase contributions vary relatively slowly, so they can be tracked and compensated for by the DSP 460. The X polarization components $I_{XI}$ and $I_{XQ}$ are described above, but the same equations apply for the Y polarization components $I_{YI}$ and $I_{YQ}$.

The system 400 is a single-wavelength, dual-polarization, coherent optical receiver system. However, the scheme may be extended to multiple-wavelength systems. In that case, a wavelength-division multiplexing (WDM) multiplexer is placed before the system 400, the WDM multiplexer outputs M wavelengths, and M PSAs are placed after the WDM multiplexer so that each wavelength is associated with a separate PSA. Alternatively, two multiplexers are placed after the PSA 405. One multiplexer is for an X polarization component, and one multiplexer is for a Y polarization component. The two multiplexers then output M wavelengths.

Figure 5:
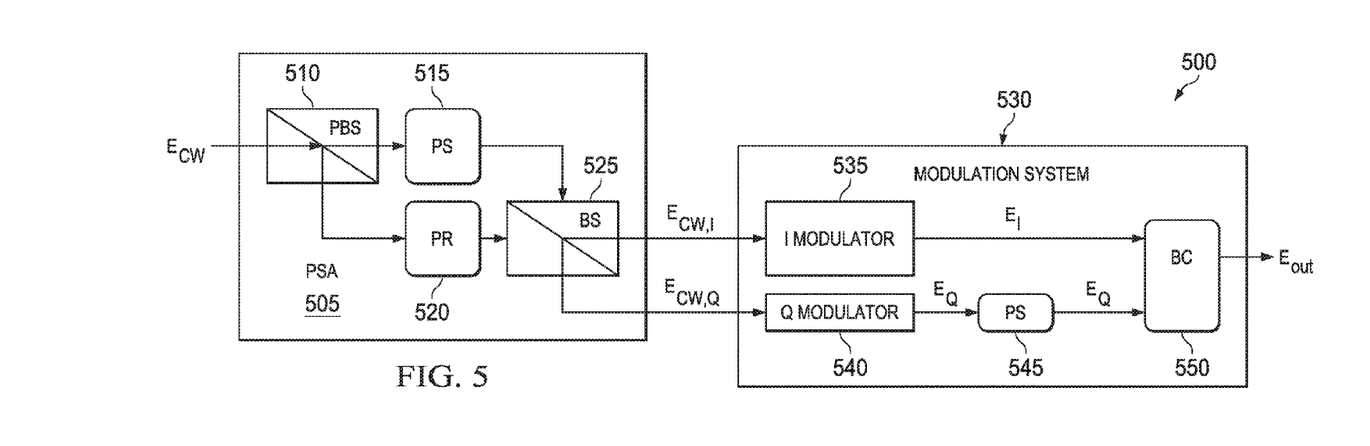
FIG. 5 is a schematic diagram of an IQ transmitter system according to an embodiment of the disclosure.

FIG. 5 is a schematic diagram of an IQ transmitter system 500 according to an embodiment of the disclosure. The system 500 generally comprises a PSA 505, which is similar to the PSA 100, and a modulator system 530. Thus, the system 500 provides an implementation of the PSA 100. The PSA 505 and the modulator system 530 may be integrated on a silicon substrate.

The PSA 505 comprises a PBS 510, a PS 515, a PR 520, and a BS 525 that are similar to the PBS 120, the PS 130, the PR 140, and the BS 150, respectively, in the PSA 100. The modulator system 530 comprises an I modulator 535, a Q modulator 540, a PS 545, and a beam combiner (BC) 550. The I modulator 535 and the Q modulator 535 may be Mach-Zehnder modulators (MZMs).

In operation, the PSA 505 receives $E_{CW}$ from a CW source, which may be relatively far away from the system 500. If the CW source is coupled to the system 500 via a SSMF, then the polarization of $E_{CW}$ may vary with time. Nonetheless, as described for the PSAs 100, 405, the PSA 505 provides $E_{CW,I}$ and $E_{CW,Q}$, which have the same TE polarization and the same power. The TE polarization corresponds to the polarization orientation of the I modulator 535 and the Q modulator 540. The I modulator 535 modulates $E_{CW,I}$ with data to produce $E_I$, then passes $E_I$ to the BC 550. The Q modulator 540 modulates $E_{CW,Q}$ with data to produce $E_Q$, then passes $E_Q$ to the PS 545. The PS 545 adds a phase change to $E_Q$ to create a 90° phase difference between $E_I$ and $E_Q$. Finally, the BC 550 combines $E_I$ and $E_Q$ into a single light $E_{out}$, then outputs $E_{out}$.

Figure 6:
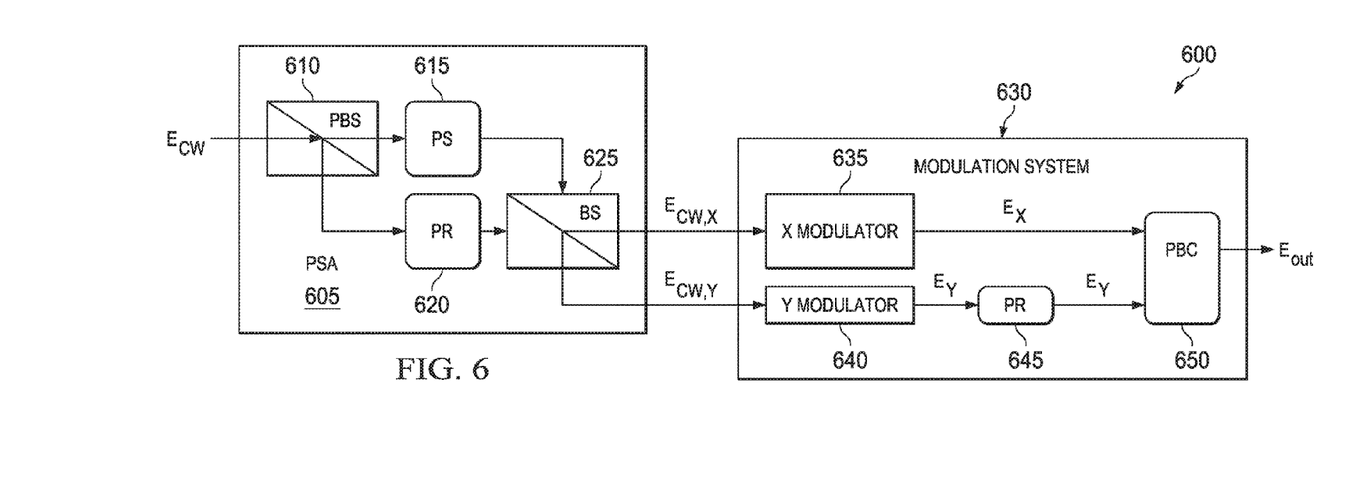
FIG. 6 is a schematic diagram of a dual-polarization transmitter system according to an embodiment of the disclosure.

FIG. 6 is a schematic diagram of a dual-polarization transmitter system 600 according to an embodiment of the disclosure. The system 600 generally comprises a PSA 605, which is similar to the PSA 100, and a modulator system 630. Thus, the system 600 provides an implementation of the PSA 100. The PSA 605 and the modulator system 630 may be integrated on a silicon substrate.

The PSA 605 comprises a PBS 610, a PS 615, a PR 620, and a BS 625 that are similar to the PBS 120, the PS 130, the PR 140, and the BS 150, respectively, in the PSA 100. The modulator system 630 comprises an X component (X) modulator 635, a Y component (Y) modulator 640, a PR 645, and a polarization beam combiner (PBC) 650. The X modulator 635 and the Y modulator 640 may be MZMs, electro-absorption (EA) modulators, or IQ modulators and may provide non-return-to-zero modulation, quadrature phase shift keying, 16-level quadrature amplitude modulator (16-QAM), or another suitable modulation format.

In operation, the PSA 605 receives $E_{CW}$ from a CW source, which may be relatively far away from the system 600. If the CW source is coupled to the system 600 via an SSMF, then the polarization of $E_{CW}$ may vary with time. Nonetheless, as described for the PSAs 100, 405, 505, the PSA 605 provides $E_{CW,X}$ and $E_{CW,Y}$, which have the same TE polarization and the same power. The TE polarization corresponds to the polarization orientation of the X modulator 635 and the Y modulator 640. The X modulator 635 modulates $E_{CW,X}$ with data to produce $E_X$, then passes $E_X$ to the PBC 650. The Y modulator 640 modulates $E_{CW,Y}$ with data to produce $E_Y$, then passes $E_Y$ to the PR 645. The PR 645 rotates $E_Y$ so that $E_Y$ has a polarization orthogonal to $E_X$. Finally, the PBC 650 combines $E_X$ and $E_Y$ into a single light $E_{out}$, then outputs $E_{out}$.

Figure 7:
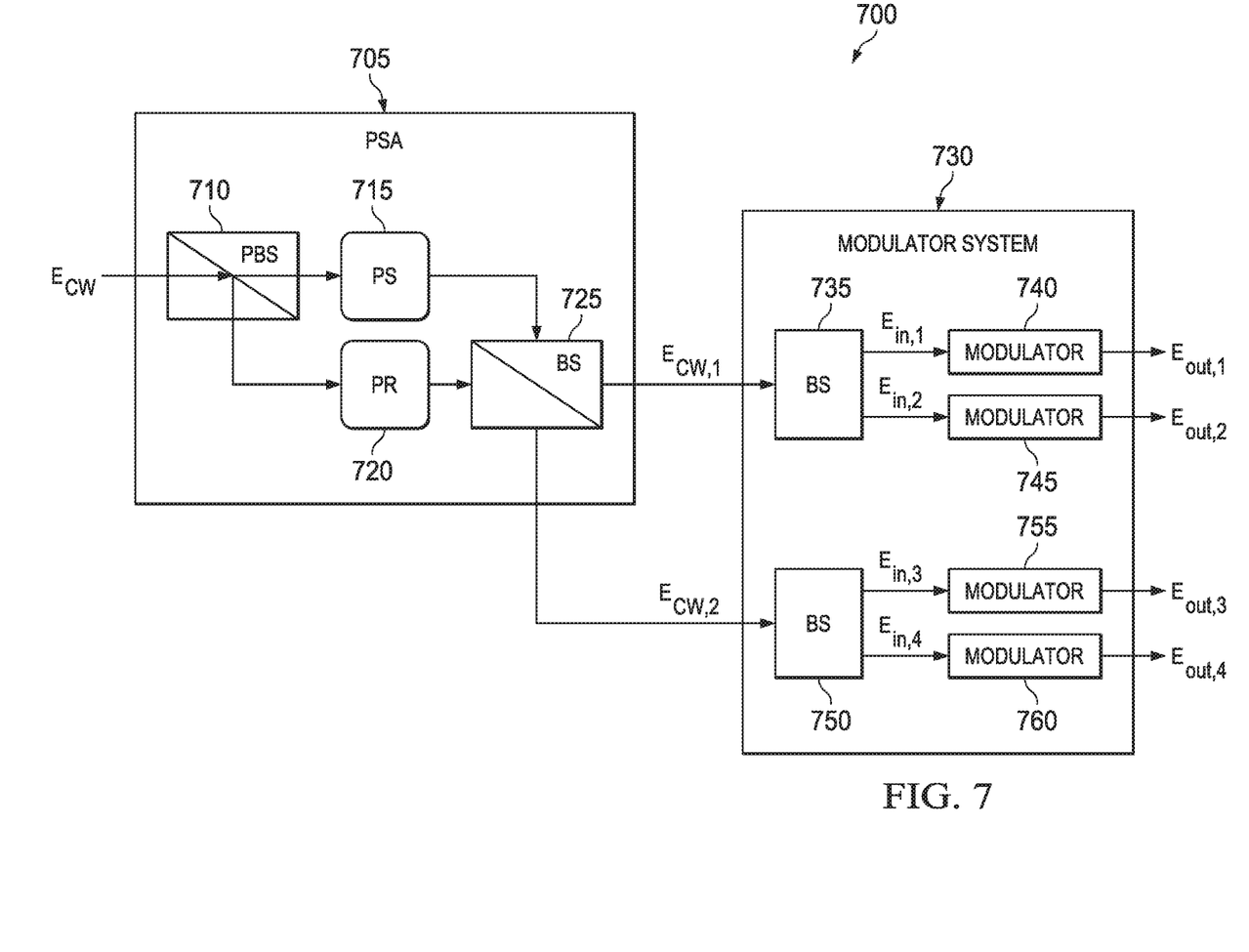
FIG. 7 is a schematic diagram of a parallel, single-mode, four-lane (PSM4) transmitter system according to an embodiment of the disclosure.

FIG. 7 is a schematic diagram of a PSM4 transmitter system 700 according to an embodiment of the disclosure. The system 700 generally comprises a PSA 705, which is similar to the PSA 100, and a modulator system 730. Thus, the system 700 provides an implementation of the PSA 100. The PSA 705 and the modulator system 730 may be integrated on a silicon substrate.

The PSA comprises a PBS 710, a PS 715, a PR 720, and a BS 725 that are similar to the PBS 120, the PS 130, the PR 140, and the BS 150, respectively, in the PSA 100. The modulator system 730 comprises a BS 735, a modulator 740, a modulator 745, a BS 750, a modulator 755, and a modulator 760. The modulators 740, 745, 755, 760 may be MZMs.

In operation, the PSA 705 receives $E_{CW}$ from a CW source, which may be relatively far away from the system 700. If the CW source is coupled to the system 700 via an SSMF, then the polarization of $E_{CW}$ may vary with time. Nonetheless, as described for the PSAs 100, 405, 505, 605, the PSA 705 provides $E_{CW,1}$ and $E_{CW,2}$, which have the same TE polarization and the same power. The TE polarization corresponds to the polarization orientation of the modulators 740, 745, 755, 760. The BS 735 equally splits $E_{CW,1}$ into $E_{in,1}$ and $E_{in,2}$, and the BS 750 equally splits $E_{CW,2}$ into $E_{in,3}$ and $E_{in,4}$. Finally, the modulator 740 modulates $E_{in,1}$ with data to produce $E_{out,1}$, then outputs $E_{out,1}$; the modulator 745 modulates $E_{in,2}$ with data to produce $E_{out,2}$, then outputs $E_{out,2}$; the modulator 755 modulates $E_{in,3}$ with data to produce $E_{out,3}$, then outputs $E_{out,3}$; and the modulator 760 modulates $E_{in,4}$ with data to produce $E_{out,4}$, then outputs $E_{out,4}$. The modulators 740, 745, 755, 760 may output $E_{out,1}$, $E_{out,2}$, $E_{out,3}$, and $E_{out,4}$, respectively, to PSM4 fibers.

Figure 8:
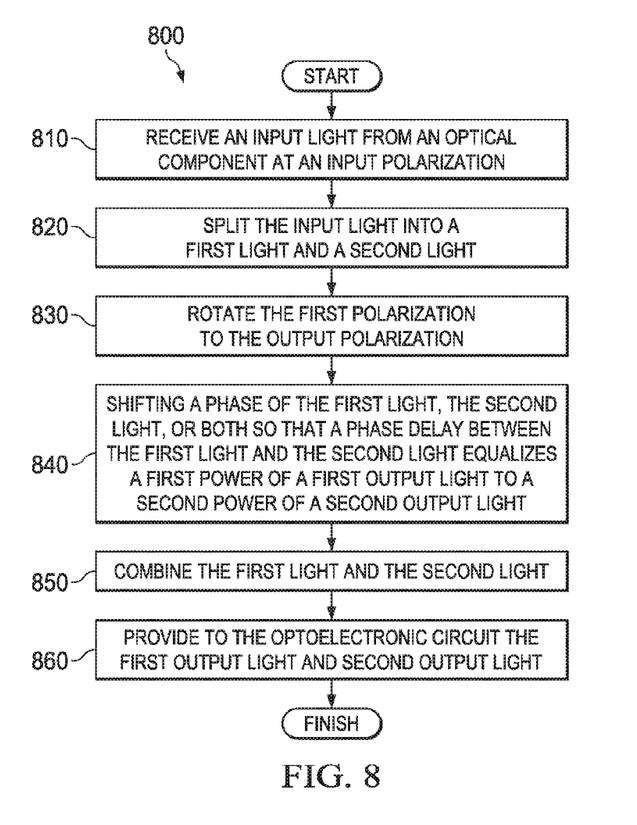
FIG. 8 is a flowchart illustrating a method of polarization state alignment according to an embodiment of the disclosure.

FIG. 8 is a flowchart illustrating a method 800 of polarization state alignment according to an embodiment of the disclosure. The PSAs 100, 300 or the systems 400, 500, 600, 700 may implement the method 800 at any suitable time, for instance upon desiring to provide LO optical signals or optical signals. At step 810, an input light is received from an optical component. The input light is at an input polarization. For instance, the PSA 100 receives $E_{in}$ from an SSMF, and $E_{in}$ comprises an arbitrary polarization. At step 820, the input light is split into a first light and a second light. The first light comprises an output polarization corresponding to an optoelectronic circuit, and the second light comprises a first polarization. For instance, the PBS 120 splits $E_{in}$ into $E_1$, which has a TE polarization, and $E_2$, which has a TM polarization. At step 830, the first polarization is rotated to the output polarization. For instance, the PR 140 rotates the polarization of $E_2$ so that $E_2$ has a TE polarization. At step 840, a phase of the first light, the second light, or both is shifted so that a phase delay between the first light and the second light equalizes a first power of a first output light to a second power of a second output light. For instance, the PS 130 shifts the phase of $E_1$ so that the phase delay between the phase of $E_1$ and the phase of $E_2$ is an integer multiple of $\pi$ so that $P_{out,1}$ and $P_{out,2}$ are equal.

Finally, at step 850, the first output light and the second output light are provided to the optoelectronic circuit. The first output light and the second output light comprise the output polarization. For instance, the PSA 100 provides $E_{out,1}$ and $E_{out,2}$ to a modulator system or a receiver, and $E_{out,1}$ and $E_{out,2}$ comprise the TE polarization.

Figure 9:
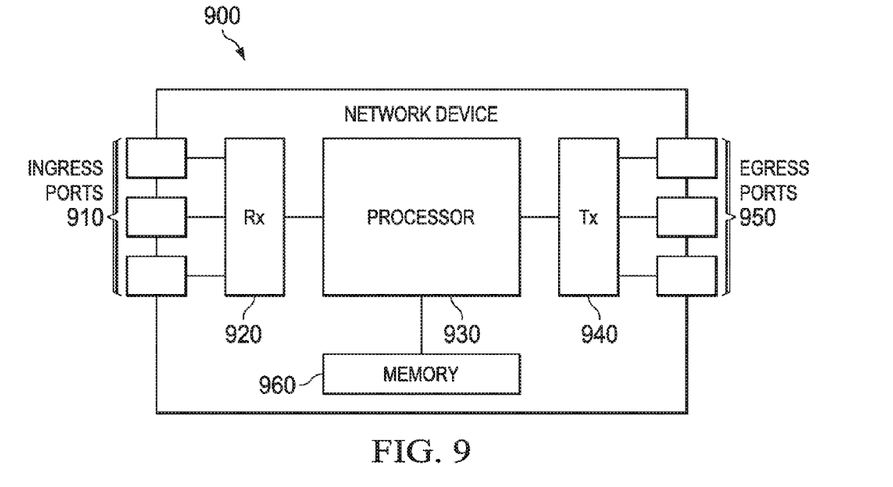
FIG. 9 is a schematic diagram of a device.

FIG. 9 is a schematic diagram of a device 900. The device 900 is suitable for implementing the disclosed embodiments. For instance, as described above, the device 900 performs calculations to determine an appropriate phase shift and instructs a PS such as the PSs 130, 340, 415, 515, 615, 715 to apply that phase shift. The device 900 comprises ingress ports 910 and receiver units (Rx) 920 for receiving data; a processor, logic unit, or central processing unit (CPU) 930 to process the data; transmitter units (Tx) 940 and egress ports 950 for transmitting the data; and a memory 960 for storing the data. The device 900 may also comprise optical-to-electrical (OE) components and electrical-to-optical (EO) components coupled to the ingress ports 910, the receiver units 920, the transmitter units 940, and the egress ports 950 for egress or ingress of optical or electrical signals.

The processor 930 is implemented by any suitable combination of hardware, middleware, and software. The processor 930 may be implemented as one or more CPU chips, cores (e.g., as a multi-core processor), field-programmable gate arrays (FPGAs), application specific integrated circuits (ASICs), and digital signal processors (DSPs). The processor 930 is in communication with the ingress ports 910, receiver units 920, transmitter units 940, egress ports 950, and memory 960.

The memory 960 comprises one or more disks, tape drives, and solid-state drives and may be used as an overflow data storage device, to store programs when such programs are selected for execution, and to store instructions and data that are read during program execution. The memory 960 may be volatile and non-volatile and may be read-only memory (ROM), random-access memory (RAM), ternary content-addressable memory (TCAM), and static random-access memory (SRAM).

The use of the term "about" means a range including ±10% of the subsequent number, unless otherwise stated. While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A system comprising:
   a polarization state aligner (PSA) comprising:
   an input port;
   a first polarization beam splitter (PBS) coupled to the input port;
   a first phase shifter (PS) coupled to the first PBS along a first path of light propagation;
   a first polarization rotator (PR) coupled to the first PBS along a second path of light promotion, wherein the first path and the second path are independent of each other;
   a first beam splitter (BS) coupled to the first PS and the first PR;
   a first output port coupled to the first BS; and
   a second output port coupled to the first BS.

2. The system of claim 1, further comprising:
   a receiver coupled to the PSA and comprising:
   a second PBS;
   a first 90 degree (°) hybrid mixer coupled to the second PBS and the first output port;
   first photodiodes (PDs) coupled to the first 90° hybrid mixer;
   first transimpedance amplifiers (TIAs) coupled to the first PDs; and
   a digital signal processor (DSP) coupled to the first TIAs.

3. The system of claim 2, wherein the receiver further comprises:
   a second PR coupled to the second PBS;
   a second 90° hybrid mixer coupled to the second PR and the first BS;
   second PDs coupled to the second 90° hybrid mixer; and
   second TIAs coupled to the second PDs and the DSP.

4. The system of claim 1, further comprising a modulator system coupled to the PSA and comprising:
   an in-phase (I) modulator coupled to the first output port;
   a quadrature phase (Q) modulator coupled to the second output port;
   a second PS coupled to the Q modulator; and
   a beam combiner (BC) coupled to the I modulator and the second PS.

5. The system of claim 4, wherein the I modulator and the Q modulator comprise Mach-Zelmder modulators (MZMs).

6. The system of claim 1, further comprising a modulator system coupled to the PSA and comprising:
   an X component (X) modulator coupled to the first output port;
   a Y component (Y) modulator coupled to the second output port;
   a second PR coupled to the Y modulator; and
   a polarization beam combiner (PBC) coupled to the X modulator and the second PR.

7. The system of claim 6, wherein the X modulator and the Y modulator are any combination of Mach-Zehnder modulators (MZMs), electro-absorption (EA) modulators, or in-phase and quadrature phase (IQ) modulators.

8. The system of claim 1, further comprising a modulator system coupled to the PSA and comprising:
   a second BS coupled to the first output port;
   a first modulator coupled to the second BS;
   a second modulator coupled to the second BS;
   a third BS coupled to the second output port;
   a third modulator coupled to the third BS; and
   a fourth modulator coupled to the third BS.

9. The system of claim 8, further comprising a substrate, wherein the PSA and the modulator system are integrated on the substrate.

10. The system of claim 1, further comprising a waveguide medium coupling the first PBS to the input port, the first PS to the first PBS, the first PR to the first PBS, the first BS to the first PS and the first PR, the first output port to the first BS, and the second output port to the first BS.

11. The system of claim 10, wherein the waveguide medium comprises air.

12. The system of claim 10, wherein the waveguide medium comprises one of silicon (Si), silicon dioxide (SiO$_2$), or indium phosphide (InP).

13. The system of claim 1, wherein the first PBS is configured to:
receive an input light; and
split the input light into a first light with a first polarization and a second light with a second polarization, wherein the first polarization and the second polarization are orthogonal to each other.

14. The system of claim 13, wherein the first polarization is a transverse electric (TE) polarization and the second polarization is a transverse magnetic (TM) polarization.

15. The system of claim 1, wherein the first PS is directly coupled to the first PBS and the first BS, and wherein the first PR is directly coupled to the first PBS and the first BS.

16. A system comprising:
a polarization state aligner (PSA) configured to:
receive an input light from an optical component at an input polarization;
split the input light into a first light and a second light, wherein the first light comprises an output polarization corresponding to an optoelectronic circuit, and wherein the second light comprises a first polarization;
rotate the first polarization to the output polarization;
combine the first light and the second light;
provide to the optoelectronic circuit a first output light associated with the first light and a second output light associated with the second light; and
adjust a phase of the first light so that the first output light and the second output light have a same power,
wherein the first output light and the second output light comprise the output polarization.

17. The system of claim 16, wherein the input polarization is any arbitrary polarization, the output polarization is a transverse electric (FE) polarization, and the first polarization is a transverse magnetic (TM) polarization.

18. A system comprising:
a polarization state aligner (PSA) comprising:
a polarization beam splitter (PBS) configured to:
receive an input light from an optical component at an input polarization; and
split the input light into a first light and a second light, wherein the first light comprises an output polarization corresponding to an optoelectronic circuits and wherein the second light comprises a first polarization;
a polarization rotator (PR) coupled to the PBS and configured to rotate the first polarization to the output polarization; and
a phase shifter (PS) coupled to the PBS and configured to shift a first phase of the first light to a second phase so that a phase delay between the first light and the second light is an integer multiple of $\pi$,
wherein the PSA is configured to:
combine the first light and the second light; and
provide to the optoelectronic circuit a first output light associated with the first light and a second output light associated with the second light, and
wherein the first output light and the second output light comprise the output polarization.

19. A system comprising:
a polarization state aligner (PSA) comprising:
a polarization splitter-rotator (PSR) configured to:
receive an input light from an optical component at an input polarization;
split the input light into a first light and a second light, wherein the first light comprises an output polarization corresponding to an optoelectronic circuit, and wherein the second light comprises a first polarization; and
rotate the first polarization to the output polarization; and
a phase shifter (PS) coupled to the PSR and configured to shift a first phase of the second light to a second phase so that a phase delay between the first light and the second light is an integer multiple of $\pi$,
wherein the PSA is configured to:
combine the first light and the second light; and
provide to the optoelectronic circuit a first output light associated with the first light and a second output light associated with the second light, and
wherein the first output light and the second output light comprise the output polarization.

20. The system of claim 16, wherein the optical component is a standard single-mode fiber (SSMF) that does not maintain polarization.

21. A method comprising:
receiving an input light from an optical component at an input polarization;
splitting the input light into a first light and a second light, wherein the first light comprises an output polarization corresponding to an optoelectronic circuit, and wherein the second light comprises a first polarization;
rotating the first polarization to the output polarization;
shifting a phase of the first light, the second light, or both so that a phase delay between the first light and the second light equalizes a first power of a first output light to a second power of a second output light;
combining the first light and the second light; and
providing to the optoelectronic circuit the first output light and the second output light, wherein the first output light is associated with the first light and the second output light is associated with the second light,
wherein the first output light and the second output light comprise the output polarization.

22. The method of claim 21, further comprising:
providing to a coherent receiver the first output light as a first local oscillator (LO) optical signal; and
providing to the coherent receiver the second output light as a second LO optical signal.

23. The method of claim 21, further comprising:
providing to a modulator system the first output light as a first continuous wave (CW) light; and
providing to the modulatorsystem the second output light as a second CW light.

* * * * *

UNITED STATES PATENT AND TRADEMARK OFFICE
CERTIFICATE OF CORRECTION

PATENT NO. : 9,819,420 B2
APPLICATION NO. : 15/057379
DATED : November 14, 2017
INVENTOR(S) : Yangjing Wen et al.

It is certified that error appears in the above-identified patent and that said Letters Patent is hereby corrected as shown below:

In the Claims

Column 12, Lines 2-15, Claim 1 should read:
1. A system comprising:
    a polarization state aligner (PSA) comprising:
        an input port;
        a first polarization beam splitter (PBS) coupled to the input port;
        a first phase shifter (PS) coupled to the first PBS along a first path of light propagation;
        a first polarization rotator (PR) coupled to the first PBS along a second path of light propagation, wherein the first path and the second path are independent of each other;
        a first beam splitter (BS) coupled to the first PS and the first PR;
        a first output port coupled to the first BS; and
        a second output port coupled to the first BS.

Column 13, Lines 46-62, through Column 14, Lines 1-7, Claim 18 should read:
18. A system comprising:
    a polarization state aligner (PSA) comprising:
        a polarization beam splitter (PBS) configured to:
            receive an input light from an optical component at an input polarization; and
            split the input light into a first light and a second light, wherein the first light comprises an output polarization corresponding to an optoelectronic circuit, and wherein the second light comprises a first polarization;
        a polarization rotator (PR) coupled to the PBS and configured to rotate the first polarization to the output polarization; and
        a phase shifter (PS) coupled to the PBS and configured to shift a first phase of the first light to a second phase so that a phase delay between the first light and the second light is an integer multiple of $\pi$, wherein the PSA is configured to:
        combine the first light and the second light; and Signed and Sealed this
Twenty-second Day of May, 2018

Andrei Iancu
*Director of the United States Patent and Trademark Office*

CERTIFICATE OF CORRECTION (continued)
U.S. Pat. No. 9,819,420 B2 provide to the optoelectronic circuit a first output light associated with the first light and a second output light associated with the second light, and
          wherein the first output light and the second output light comprise the output polarization.

Column 14, Lines 57-61, Claim 23 should read:
23. The method of claim 21, further comprising:
          providing to a modulator system the first output light as a first continuous wave (CW) light; and
          providing to the modulator system the second output light as a second CW light.